United States Patent
Henon et al.

(10) Patent No.: US 9,829,353 B2
(45) Date of Patent: Nov. 28, 2017

(54) INSTRUMENT PANEL FOR MOTOR VEHICLES AND METHOD OF ILLUMINATION

(71) Applicant: JOHNSON CONTROLS AUTOMOTIVE ELECTRONICS SAS, Cergy Pontoise (FR)

(72) Inventors: Fabrice Henon, Cergy (FR); Yahia Hammiche, Argenteuil (FR); Boyan Tzankov, Sofia (BG)

(73) Assignee: JOHNSON CONTROLS AUTOMOTIVE ELECTRONICS SAS, Cergy Pontoise (FR)

( * ) Notice: Subject to any disclaimer, the term of this patent is extended or adjusted under 35 U.S.C. 154(b) by 170 days.

(21) Appl. No.: 14/650,885

(22) PCT Filed: Dec. 10, 2012

(86) PCT No.: PCT/EP2012/074912
§ 371 (c)(1),
(2) Date: Jun. 10, 2015

(87) PCT Pub. No.: WO2014/090271
PCT Pub. Date: Jun. 19, 2014

(65) Prior Publication Data
US 2015/0308868 A1  Oct. 29, 2015

(51) Int. Cl.
*G01D 11/28* (2006.01)
*B60K 37/02* (2006.01)

(52) U.S. Cl.
CPC .............. *G01D 11/28* (2013.01); *B60K 37/02* (2013.01); *B60K 2350/102* (2013.01);
(Continued)

(58) Field of Classification Search
CPC . B60Q 3/62; B60Q 3/64; G01D 11/28; B60K 2350/203; B60K 35/00; B60K 37/00; B60K 37/02; B60K 37/07; B60K 37/06
(Continued)

(56) References Cited

U.S. PATENT DOCUMENTS 6,820,990 B2 *  11/2004  Ewers ................... B60Q 3/004
                                                    362/23.08
7,207,117 B1 *  4/2007  Cook ..................... G01D 11/28
                                                    116/286
(Continued)

FOREIGN PATENT DOCUMENTS

JP       2003254794 A    9/2003
JP       2010019601 A    1/2010
(Continued)

*Primary Examiner* — Robert May
(74) *Attorney, Agent, or Firm* — Leydig, Voit & Mayer, Ltd.

(57) ABSTRACT

An instrument panel for a motor vehicle includes: a display area including a first portion, a second portion, and a third portion. The first portion is located in a first main plane of extension. The second portion is located in a second main plane of extension. The second main plane of extension is positioned relative to the first main plane of extension with respect to a user of the instrument panel such that the second portion of the display area is positioned further from a normal position of the eyes of the user relative to the first portion of the display area. The instrument panel further includes an optical conductor, the optical conductor including a first part and a second part. At least part of the second portion and/or at least part of the third portion of the display area is illuminated by the second part of the optical conductor.

10 Claims, 3 Drawing Sheets

(52) U.S. Cl.
CPC    *B60K 2350/1064* (2013.01); *B60K 2350/203* (2013.01); *B60K 2350/402* (2013.01); *B60K 2350/408* (2013.01)

(58) Field of Classification Search
USPC ................................ 362/23.16, 23.17, 23.09
See application file for complete search history.

(56)                References Cited

U.S. PATENT DOCUMENTS

| | | | | |
|---|---|---|---|---|
| 7,537,353 | B2 * | 5/2009 | Birman | B60K 35/00 |
| | | | | 116/286 |
| 7,675,428 | B2 * | 3/2010 | Pala | G01D 11/28 |
| | | | | 116/284 |
| 7,771,069 | B2 * | 8/2010 | Werman | G01D 7/00 |
| | | | | 362/23.01 |
| 8,128,248 | B2 * | 3/2012 | Feit | G01D 11/28 |
| | | | | 116/DIG. 5 |
| 2006/0120062 | A1 | 6/2006 | Wu | |
| 2008/0105191 | A1 | 5/2008 | Kato | |
| 2010/0020528 | A1 | 1/2010 | Feit | |

FOREIGN PATENT DOCUMENTS

| | | |
|---|---|---|
| JP | 2010230327 A | 10/2010 |
| WO | WO 2008105262 A1 | 9/2008 |

* cited by examiner 3.1.1   3.1.2

INSTRUMENT PANEL FOR MOTOR VEHICLES AND METHOD OF ILLUMINATION

CROSS-REFERENCE TO RELATED APPLICATIONS

This application is a U.S. National Phase application under 35 U.S.C. §371 of International Application No. PCT/EP2012/074912, filed on Dec. 10, 2012. The International Application was published in English on Jun. 19, 2014 as WO 2014/090271 A9 under PCT Article 21(2).

FIELD

The present invention relates to an instrument panel or dashboard, in particular for a motor vehicle, the instrument panel comprising at least one display area, wherein the display area of the instrument panel comprises a first portion, wherein the display area of the instrument panel comprises a second portion, wherein the display area of the instrument panel comprises a third portion.

Additionally, the present invention relates to a method of illumination of an instrument panel of a motor vehicle or of at least parts of an instrument panel for a motor vehicle.

BACKGROUND

In the conventional prior art, an instrument panel or a dashboard, especially for vehicles, is known for producing a luminescent halo effect, for example, from document U.S. 2006/0120062 A1.

Such instrument panels may comprise a pointer or a needle such that the pointer is rotated or bent, for example, to display a value such as speed and other quantities that affect a driver of a motor vehicle.

In addition, dashboards are known including a display area and comprising a first portion of the display area and having a second portion of the display area, the first portion of the display area being located in a first main plane of extension, the second portion of the display area being located in a second main plane of extension, wherein the second main plane of extension is located substantially parallel to the first main plane of extension, wherein the second main plane of extension is positioned relative to the first main plane of extension of the first portion of the display area with respect to a user of the instrument panel such that the second part of the display area is positioned further from the normal position of the eyes of the user compared to the first part of the display area.

It is also known to provide bent pointers that can be rotated about an axis of rotation of the dial behind the dashboard to allow the dashboard to display other information in the place or around the axis of rotation of the pointer.

SUMMARY

In an embodiment, the invention provides an instrument panel for a motor vehicle. The instrument panel includes: a display area, comprising a first portion, a second portion, and a third portion. The first portion of the display area is located in a first main plane of extension. The second portion of the display area is located in a second main plane of extension. The second main plane of extension is substantially parallel to the first main plane of extension. The second main plane of extension is positioned relative to the first main plane of extension with respect to a user of the instrument panel such that the second portion of the display area is positioned further from a normal position of the eyes of the user relative to the first portion of the display area. The instrument panel further comprises: at least one light source; and an optical conductor, the optical conductor being associated with the first portion of the display area, the optical conductor comprising a first part for backlighting the first portion of the display area, and the optical conductor comprising a second part. At least part of the second portion of the display area and/or at least part of the third portion of the display area is illuminated by the second part of the optical conductor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
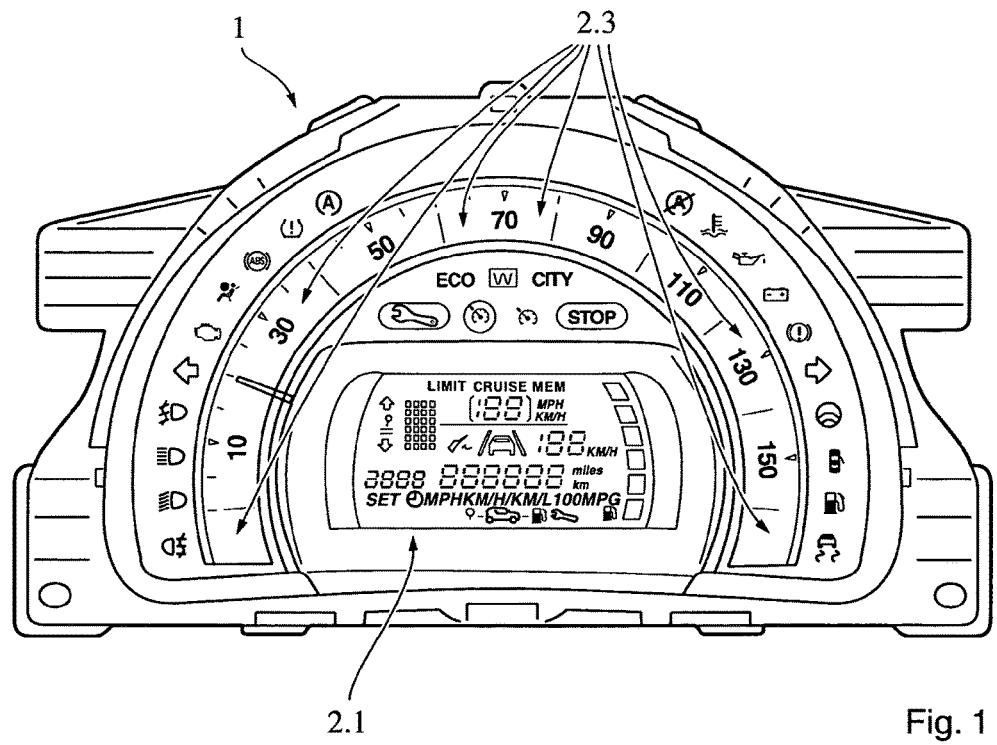
FIG. 1 is a schematic view of a round dial indicator of an instrument panel.
Figure 2:
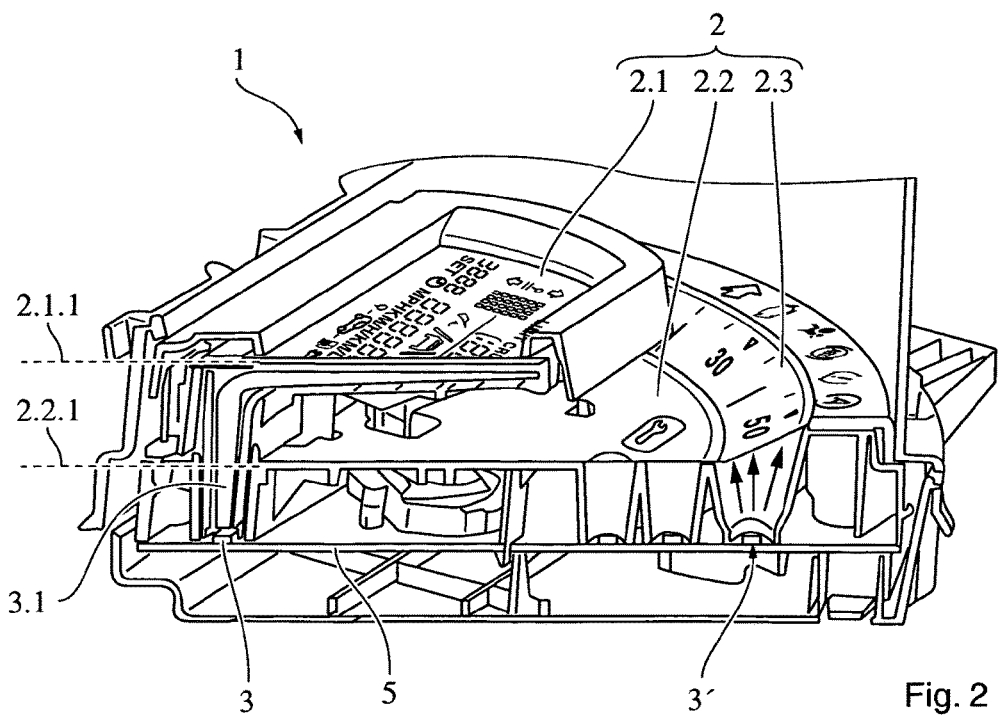
FIG. 2 is a schematic perspective view of an instrument panel according to the prior art, having a backlighting light source for the third portion of the display area.
Figure 3:
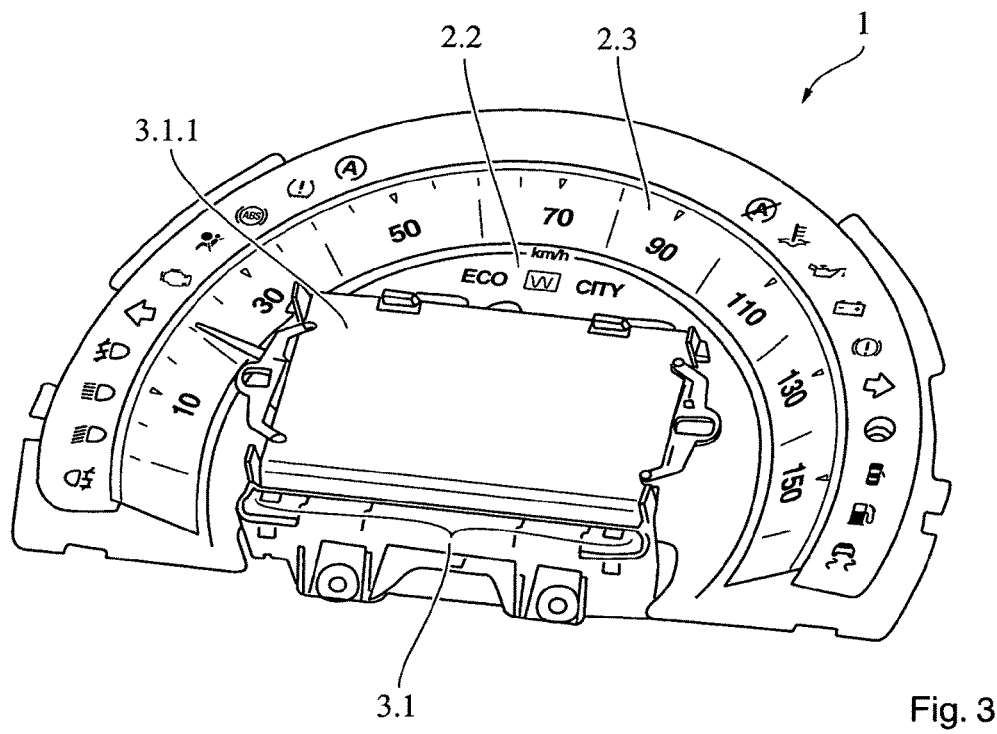
FIGS. 3 to 5 are further schematic views of an instrument panel according to the present invention.
Figure 4:
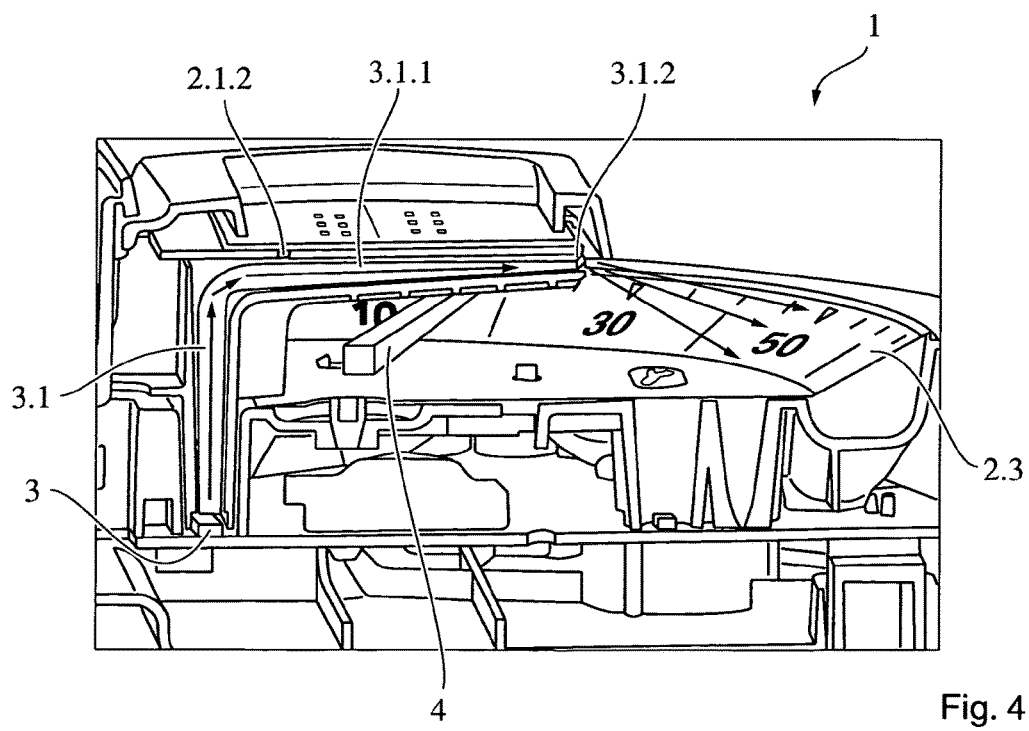
Figure 5:
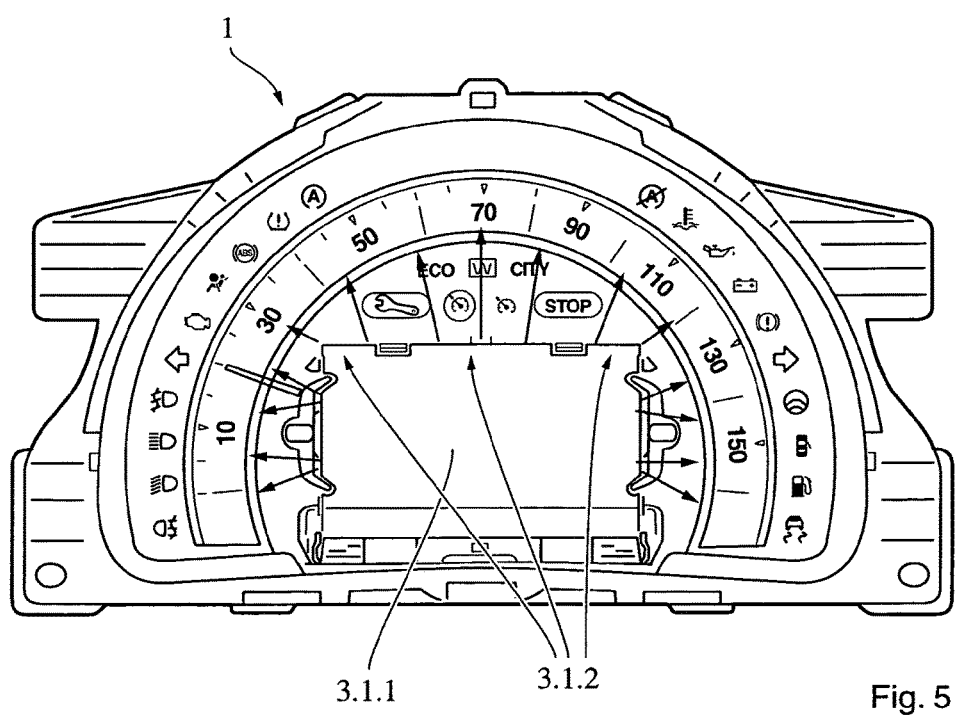

In the prior art, it is difficult to make a dashboard such that the costs are minimized and yet a multitude of different functions are performed, including functions for user comfort, such as modes of illumination of the instrument panel.

In an embodiment, the present invention provides an instrument panel which achieves illumination modes that provide the possibility of a more cost effective production of the instrument panel without the need to increase operational costs, especially in terms of energy consumption.

In an embodiment the present invention provides an instrument panel for motor vehicles, the instrument panel comprising at least one display area, wherein the display area of the instrument panel comprises a first portion, wherein the display area of the instrument panel comprises a second portion, wherein the display area of the instrument panel comprises a third portion, wherein the first portion of the display area is located in a first main plane of extension, wherein the second portion of the display area is located in a second main plane of extension, wherein the second main plane of extension is located substantially parallel to the first main plane of extension, wherein the second main plane of extension is positioned relative to the first main plane of extension of the first portion of the display area with respect to a user of the instrument panel such that the second part of the display area is positioned further from the normal position of the eyes of the user compared to the first part of the display area, wherein the instrument panel comprises at least one light source and an optical conductor, the optical conductor being associated with the first portion of the display area, the optical conductor comprising a first part for backlighting the first portion of the display area, wherein the optical conductor comprises a second part such that at least part of the second portion of the display area and/or at least part of the third portion of the display area is illuminated by the second part of the optical conductor.

Through such an embodiment of a display device, it is advantageously possible to illuminate at least a part of the second portion of the display area and/or at least a part of the third portion of the display area by means of light emitted from the second part of the optical conductor.

According to a preferred embodiment of the present invention, the third portion of the display area is positioned inclined relative to the first main plane of extension of the first portion of the display area and/or relative to the second main plane of extension of the second portion of the display area.

Thereby, it is advantageously possible, e.g. to provide the display area of the instrument panel in an esthetic and flexible manner.

According to a preferred embodiment of the present invention, the third portion of the display area is a dial member of the display area.

Thereby, it is advantageously possible, e.g. to provide the display area of the instrument panel such that a rotary pointer (cooperating with the dial member in order to display values, e.g. of a current velocity of the vehicle and/or of the number of rotations per time unit (especially per minute) of an internal combustion engine of the vehicle in an esthetic and effective manner) displays values, e.g. of the current velocity.

According to still a further embodiment of the present invention, it is preferred that light emitted from the second part of the optical conductor illuminates the third portion of the display area.

Thereby, it is advantageously possible according to the present invention to avoid to provide a backlighting to the third portion of the display area. Furthermore, the third portion of the display area is always correctly illuminated as the backlighting of the first portion of the display area by means of the first part of the optical conductor is always switched on when the instrument panel is operated both during daylight conditions as during nightlight conditions.

According to still a further embodiment of the present invention, it is preferred that the illumination of the second part of the optical conductor is visible to a user of the instrument panel.

According to still a further embodiment of the present invention, it is preferred that the light from the second part of the optical conductor is emitted inclined relative to the first main plane of extension and/or relative to the second main plane of extension towards the third portion of the display area.

According to still a further embodiment of the present invention, it is preferred that the instrument panel comprises a rotary pointer driven in rotation about an axis of rotation, the axis of rotation is provided positioned beneath the first portion of the display area, the rotary pointer moving between the first main plane of extension and the second main plane of extension, the rotary pointer being visible to a user only in the second portion of the display area and/or in the third portion of the display area.

Thereby, it is advantageously possible according to the present invention to use the central portion, i.e. the first portion of the display area of the instrument panel, for the display of information other than the information indicated by the rotary pointer by means of its position about the axis of rotation.

According to still a further embodiment of the present invention, it is preferred that the first portion of the display area includes a display device, in particular liquid crystal display (LCD display) or a thin-film-transistor display (TFT display).

According to still a further embodiment of the present invention, it is preferred that the display device is a display device of matrix type.

According to still a further embodiment of the present invention, it is preferred that the light source is activated continuously when the instrument panel is operated.

In an embodiment, the present invention provides a method of illumination of an instrument panel for motor vehicles, the instrument panel comprising at least one display area, wherein the display area of the instrument panel comprises a first portion, wherein the display area of the instrument panel comprises a second portion, wherein the display area of the instrument panel comprises a third portion, wherein the first portion of the display area is located in a first main plane of extension, wherein the second portion of the display area is located in a second main plane of extension, wherein the second main plane of extension is located substantially parallel to the first main plane of extension, wherein the second main plane of extension is positioned relative to the first main plane of extension with respect to a user of the instrument panel such that the second part of the display area is positioned further from the normal position of the eyes of the user compared to the first part of the display area, wherein the instrument panel comprises at least one light source and an optical conductor, the optical conductor being associated with the first portion of the display area, the optical conductor comprising a first part for backlighting the first portion of the display area, wherein the optical conductor comprises a second part, wherein the method comprises the step that at least part of the second portion of the display area and/or at least part of the third portion of the display area is illuminated by the second part of the optical conductor.

Other features and advantages of the invention will become apparent upon reading the following description, the following description providing an exemplary and non-limiting embodiment of the invention.

The same parts or components of the inventive instrument panel are designated by the same reference symbols in different figures.

FIG. 1 is a schematic top view of an instrument panel 1, e.g., for motor vehicles. The instrument panel 1 comprises a display area 2. The display area 2 comprises a first portion 2.1, a second portion 2.2, and a third portion 2.3.

According to the present invention, the first portion 2.1 of the display area 2 is located in a first main plane of extension 2.1.1. Furthermore, the second portion 2.2 of the display area 2 is located in a second main plane of extension 2.2.1. The third portion 2.3 of the display area 2 is preferably located either also in the second main plane of extension 2.2.1. Alternatively, the third portion 2.3 of the display area 2 is positioned inclined relative to the first main plane of extension 2.1.1 of the first portion 2.1 of the display area 2 and/or relative to the second main plane of extension 2.2.1 of the second portion 2.2 of the display area. The inclination angle is preferably between 5° to 70°, more preferably between 10° and 50° and most preferably between 20° and 40°.

According to the present invention, a backlighting light source 3' provided to backlight the third portion 2.3 of the display area 2 in an instrument panel according to the prior art is not needed. Therefore, the instrument panel 1 according to the present invention can be provided involving reduced costs. Furthermore, with the instrument panel 1 according to the present invention, it is not necessary that the backlighting light source 3' provided to backlight the third portion 2.3 of the display area 2 is operated during certain operating conditions of the instrument panel 1, especially during the night, hence the consumption of energy can be reduced.

According to the present invention, a light source 3 is provided and coupled to an optical conductor 3.1, the optical conductor 3.1 providing a backlighting of the first portion 2.1 of the display area 2 by means of a first part 3.1.1 of the optical conductor 3.1. By means of a second part 3.1.2 of the optical conductor 3.1, at least part of the second portion 2.2 of the display area 2 and/or at least part of the third portion 2.3 of the display area 2 is illuminated by the second part of the optical conductor 3.1. In the example represented in the figures, only the third portion 2.3 of the display area 2 is illuminated by means of the second part 3.1.2 of the optical conductor 3.1.

According to the present invention, the instrument panel 1 also comprises a rotary pointer 4 and the third portion 2.3 of the display area 2 corresponds to a dial related to the rotary pointer 4.

The light source 3 is preferably an LED (light emitting diode) located on a printed circuit board 5 of the instrument panel 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 1 instrument panel/dashboard
2 display area
2.1 first portion of the display area
2.1.1 first main plane of extension
2.1.2 display device
2.2 second portion of the display area
2.2.1 second main plane of extension
2.3 third portion of the display area
3 light source
3' backlighting light source
3.1 optical conductor
3.1.1 first part of the optical conductor
3.1.2 second part of the optical conductor
4 rotary pointer
5 printed circuit board

The invention claimed is:

1. An instrument panel for a motor vehicle, the instrument panel comprising:
   a display area, comprising a first portion, a second portion, and a third portion, wherein each of the first, second and third portions of the display area are configured to display different information to a user of the instrument panel;
   wherein the first portion of the display area is located in a first main plane of extension;
   wherein the second portion of the display area is located in a second main plane of extension;
   wherein the second main plane of extension is located substantially parallel to the first main plane of extension;
   wherein the second main plane of extension is positioned relative to the first main plane of extension with respect to the user of the instrument panel such that the second portion of the display area is positioned further from a normal position of the eyes of the user relative to the first portion of the display area;
   wherein the third portion of the display area is positioned inclined relative to the first main plane of extension and/or relative to the second main plane of extension;
   wherein the instrument panel further comprises:
   at least one light source; and
   an optical conductor, the optical conductor being associated with the first portion of the display area, the optical conductor comprising a first part for backlighting the first portion of the display area, and the optical conductor comprising a second part, wherein at least part of the second portion of the display area and/or at least part of the third portion of the display area is illuminated by the second part of the optical conductor.

2. The instrument panel according to claim 1, wherein the third portion of the display area corresponds to a dial of the display area.

3. The instrument panel according to claim 1, wherein light emitted from the second part of the optical conductor illuminates the third portion of the display area.

4. The instrument panel according to claim 1, wherein the illumination of the second part of the optical conductor is visible to a user of the instrument panel.

5. The instrument panel according to claim 1, wherein light from the second part of the optical conductor is emitted inclined relative to the first main plane of extension and/or relative to the second main plane of extension towards the third portion of the display area.

6. The instrument panel according to claim 1, further comprising:
   a rotary pointer, configured to be driven in rotation about an axis of rotation, wherein the axis of rotation is positioned beneath the first portion of the display area, wherein the rotary pointer is configured to move between the first main plane of extension and the second main plane of extension, and wherein the rotary pointer is visible to a user only in the second portion of the display area and/or in the third portion of the display area.

7. The instrument panel according to claim 1, wherein the first portion of the display area includes a display device, wherein the display device is a liquid crystal display (LCD display) device or a thin-film-transistor display (TFT display) device.

8. The instrument panel according to claim 7, wherein the display device is a display device of matrix type.

9. The instrument panel according to claim 1, wherein the at least one light source is configured to be activated continuously when the instrument panel is operated.

10. A method of illumination of an instrument panel for a motor vehicle,
the instrument panel comprising a display area, wherein the display area of the instrument panel comprises a first portion, a second portion, and a third portion, wherein each of the first, second and third portions of the display area are configured to display different information to a user of the instrument panel,
wherein the first portion of the display area is located in a first main plane of extension,
wherein the second portion of the display area is located in a second main plane of extension,
wherein the second main plane of extension is located substantially parallel to the first main plane of extension,
wherein the second main plane of extension is positioned relative to the first main plane of extension with respect to a user of the instrument panel such that the second portion of the display area is positioned further from the normal position of the eyes of the user relative to the first portion of the display area,
wherein the third portion of the display area is positioned inclined relative to the first main plane of extension and/or relative to the second main plane of extension;
wherein the instrument panel further comprises at least one light source and an optical conductor, the optical conductor being associated with the first portion of the display area, the optical conductor comprising a first part for backlighting the first portion of the display area, and the optical conductor comprising a second part,
wherein the method comprises:
illuminating, by the second part of the optical conductor, at least part of the second portion of the display area and/or at least part of the third portion of the display area.

\* \* \* \* \*